Patented Sept. 17, 1946

2,407,668

UNITED STATES PATENT OFFICE 2,407,668

FIRE RESISTANT COATING COMPOSITION

Martin Leatherman, Hyattsville, Md.

No Drawing. Application June 20, 1942,
Serial No. 447,871

10 Claims. (Cl. 260—32)

(Granted under the act of March 3, 1883, as
amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to fire retarding or fire resistant coatings for fibrous combustible materials in filamentary or foraminous, reticulated form, whether woven, felted or in layers and is applicable to cotton, rayon, wool, silk and the like.

My invention is adaptable to make various types of finished articles. It can be used to produce a water repellant but porous finish or it can be used to produce a rubber-like coating which is impermeable to air. If the fabric to be coated is immersed in my composition and then squeezed lightly, a thin fabric such as 80 square print cloth shows numerous tiny pinholes which permit free passage of air, but which offer considerable resistance to the passage of water. If the dipped fabric is immediately brushed on one side with my composition, an elastic flexible rubber-like and impermeable finish results which adheres tightly to the dipped and squeezed fabric. The unbrushed side retains its soft fabric-like appearance and feel. If, however, the dipped and lightly squeezed fabric is again dipped and excess composition scraped off without squeezing, an adherent rubber-like finish is imparted to both faces of the fabric.

The flexibility, elasticity and generally rubber-like appearance of my composition is imparted by the presence of suitable amounts of acrylate or methacrylate ester polymers. These polymers have little or no flame resistance but contribute the desirable physical properties. Another resinous constituent of my composition is either polyvinyl chloride or a co-polymer of vinyl acetate and vinyl chloride. The addition of even a few parts of acrylate or methacrylate ester polymer to the polyvinyl chloride or co-polymer of vinyl acetate and vinyl chloride imparts much improved elasticity and toughness to my coating composition.

A third constituent of my composition is zinc carbonate. It is the interaction of the vinyl polymer with the zinc carbonate which imparts fire resistance to the fibrous materials when coated with my composition. When the coated material is subjected to ignition temperatures, the vinyl polymer decomposes with evolution of hydrochloric acid which, in addition to possessing excellent flame preventing properties, reacts with the zinc carbonate to liberate carbon dioxide and catalytically active zinc oxide. The zinc oxide acts as a dehydration catalyst in the case of cellulosic materials to split the carbohydrate into water and carbon, thus assisting in preventing flaming.

A fourth constituent of my composition may be some form of opaque pigment which while not required as a flameproofing ingredient, may be desirable to screen out light which in some cases acts detrimentally on the vinyl polymer constituent. A fifth constituent is a suitable plasticizer or softener, a preferred form of which is tricresyl phosphate although certain chlorinated diphenyls, dibutyl phthalate, triphenyl phosphate or any other compatible plasticizer or mixture of plasticizers may also be used.

In practicing my invention a preferred method is to dissolve the resinous constituents together with the plasticizer in compatible solvents and suspend the zinc carbonate and pigments in the solution by any suitable dispersion method. The effect obtained is in large measure determined by the proportion of solvent or diluent present.

The following examples of compositions embodying my invention are given by way of illustration but not of limitation.

*Example I*

7.5 parts of a 33⅓% solution of n-butyl methacrylate polymer in equal parts of xylol and butanol is blended with 30 parts of a 25% solution of co-polymer of vinyl chloride and vinyl acetate in acetone, 5 parts of tricresyl phosphate is added and 3 parts of zinc carbonate together with a suitable amount of inert pigment are suspended in the resin solution by use of conventional paint grinding equipment.

As additional ingredients I also employ such fungicides as pentachlorphenol, copper naphthenate, cadmium naphthenate, zinc naphthenate, zinc pentachlorphenate, halogenated phenyl phenates and the like in amounts approximating 1% of the weight of the fibrous material.

In the above formula I may substitute the methyl, ethyl or propyl polymerized ester of acrylic acid or of methacrylic acid for n-butyl methacrylate and likewise I may use a polyvinylchloride resin instead of the copolymer of vinyl acetate and vinyl chloride. Depending upon the degree of flame resistance desired, I may vary the relative proportions of the resinous components with respect to each other. The less methacrylate or acrylate resin present with respect to vinyl chloride resin the greater the degree of flame resistance. However, if the relative amount of the former is dropped too low, adhesion, flexibility and elasticity are lessened undesirably in view of the presence of the suspended solids. On the other hand, if too much of the acrylate or methacrylate resin is substituted for the vinyl resin fire resistance is reduced. In general, it would not be desirable to use more methacrylate or acrylate resin than vinyl resin in the composition.

*Example II*

20 lbs. polyvinyl chloride, 8 lbs. of zinc carbonate, 8 lbs. of tricresyl phosphate, 7 lbs. triphenyl phosphate, 7 lbs. of inert pigment, 45 lbs. of acetone, 0.8 lb. zinc naphthenate and ½ lb. of pentachlorphenol.

In the foregoing examples the proportion of methacrylate polymers to vinyl polymers may vary from those given to equal parts of the two types, depending upon the properties desired.

*Example III*

10 lbs. of vinyl acetate-vinyl chloride copolymer dissolved in 30 lbs. of acetone. A paste is made by grinding 6 lbs. zinc carbonate, 2.1 lbs. chromium oxide, 1.2 lbs. ferric oxide (Venetian red), 1 lb. lead chromate, ½ lb. zinc naphthenate in 9.3 lbs. mineral spirits and the paste is then blended with the above copolymer dissolved in acetone.

Example III is particularly adapted for use on yarn, etc., as hereinafter mentioned and may be modified by the addition of compatible plasticizers.

The coating characteristics are largely determined by the viscosity of the coating composition. If the viscosity is reduced by addition of solvent, an impregnated type of finish is obtained upon evaporation of solvent, that is, the fibrous material absorbs the composition and the pores remain open. With increased viscosity, penetrative qualities of the composition are decreased and a continuous film or coating of a rubber-like nature covers the whole surface of the fabric. In this form the coating is impervious to air. An advantage of this continuous film lies in the fact that, because of the thermoplasticity of my composition, the coated fabric can be lapped and caused to form a strong bond by the application of heat.

It is understood that the examples above cited can be varied with respect to the proportions of all constituents. As stated before, I may vary the relative proportions of vinyl chloride polymer and methacrylate or acrylate polymer. I may vary the proportion of zinc carbonate to vinyl polymer. A preferred range is from 1 part zinc carbonate to 1½ parts of vinyl polymer to 1 part zinc carbonate to 3 parts of vinyl polymer. The absolute amount of inert pigment used will vary with the severity of weather exposure and with the type of pigment used. The proportion of plasticizer will vary with the degree of flexibility desired and with the type of plasticizer used. Finally the solvent employed can be any individual solvent or blend of solvents which is compatible with the synthetic resin mixture in my composition. Among the solvents which can be employed at least in part are acetone, ethanol, butanol, isobutanol, diacetone alcohol, xylol, toluol, naphtha or Stoddard solvent.

It is also understood that the fire resistant qualities of my coating composition do not reside in the acrylate or methacrylate polymers. If desired, for certain purposes, these may be omitted completely, in which case, provided the plasticizer is also omitted, a composition is obtained which may be used to provide a fireproof, non-flexible coating for cotton yarn and fabrics.

I claim:

1. A rot-resistant, fireproofed, water-repellant porous material, comprising a combustible fabric treated with a composition having the following constituents in substantially the proportions specified: 2½ parts of material from the group consisting of n-butyl methacrylate polymer, and the ethyl, methyl, and propyl polymerized esters of acrylic and methacrylic acids; 2½ parts xylol, 2½ parts butanol; 7½ parts resin from the group consisting of vinyl chloride-vinyl acetate copolymer and polyvinyl chloride; 22½ parts acetone, 5 parts tricresyl phosphate, 3 parts zinc carbonate, and a fungicide in quantity equal to one percent by weight of said fabric.

2. A rot-resistant, fireproofed, water-repellant porous material, comprising a combustible fabric treated with a composition having the following constituents in substantially the proportions specified: 2½ parts of material from the group consisting of n-butyl methacrylate polymer, and the ethyl, methyl, and propyl polymerized esters of acrylic and methacrylic acids; 2½ parts xylol, 2½ parts butanol; 7½ parts resin from the group consisting of vinyl chloride-vinyl acetate copolymer and polyvinyl chloride; 22½ parts acetone, 5 parts tricresyl phosphate, and 3 parts zinc carbonate.

3. A rot-resistant, fireproofed, air-impervious impregnated material having a smooth rubber-like coat of impregnant on one surface only, comprising a combustible fabric treated with a said impregnant composition having the following constituents in substantially the proportions specified: 2½ parts of polymerized ester from the group consisting of n-butyl methacrylate polymer, and the ethyl, methyl, and propyl polymerized esters of acrylic and methacrylic acids; 2½ parts xylol, 2½ parts butanol; 7½ parts resin from the group consisting of vinyl chloride-vinyl acetate copolymer and polyvinyl chloride; 22½ parts acetone, 5 parts tricresyl phosphate, 3 parts zinc carbonate, and a fungicide in quantity equal to one percent by weight of said fabric.

4. A rot-resistant, fireproofed, air-impervious impregnated material having a smooth rubber-like coat of impregnant on one surface only, comprising a combustible fabric treated with a said impregnant composition having the following constituents in substantially the proportions specified: 2½ parts of polymerized ester from the group consisting of n-butyl methacrylate polymer, and the ethyl, methyl, and propyl polymerized esters of acrylic and methacrylic acids; 2½ parts xylol, 2½ parts butanol; 7½ parts resin from the group consisting of vinyl chloride-vinyl acetate copolymer and polyvinyl chloride; 22½ parts acetone, 5 parts tricresyl phosphate, and 3 parts zinc carbonate.

5. A rot-resistant, fireproofed, air-impervious material, comprising a combustible fabric impregnated with and having on each surface a smooth coating of a composition having the following constituents in substantially the proportions specified; 2½ parts of polymerized ester from the group consisting of n-butyl methacrylate polymer, and the ethyl, methyl, and propyl polymerized esters of arcylic and methacrylic acids; 2½ parts xylol, 2½ parts butanol; 7½ parts resin from the group consisting of vinyl chloride-vinyl acetate copolymer and polyvinyl chloride; 22½ parts acetone, 5 parts tricresyl phosphate, 3 parts zinc carbonate, and a fungicide in quantity equal to one percent by weight of said fabric.

6. A rot-resistant, fireproofed, air-impervious material, comprising a combustible fabric impregnated with and having on each surface a smooth coating of a composition having the following constituents in substantially the proportions specified; 2½ parts of polymerized ester from the group consisting of n-butyl methacrylate polymer, and the ethyl, methyl, and propyl polymerized esters of acrylic and methacrylic acids; 2½ parts xylol, 2½ parts butanol; 7½ parts resin from the group consisting of vinyl chloride-vinyl acetate copolymer and polyvinyl chloride; 22½ parts acetone, 5 parts tricresyl phosphate, and 3 parts zinc carbonate.

7. A composition for rendering combustible fabric rot- and fire-resistant, comprising the following materials substantially in the proportions stated: 2½ parts n-butyl methacrylate polymer, 2½ parts xylol, 2½ parts butanol, 7½ parts vinyl chloride-vinyl acetate polymer, 22½ parts acetone, 5 parts tricresyl phosphate, 3 parts zinc carbonate, and a fungicide in quantity equal to one percent by weight of the fabric to be treated.

8. A composition for rendering combustible fabric rot- and fire-resistant, comprising the following materials substantially in the proportions stated: 2½ parts n-butyl methacrylate polymer, 2½ parts xylol, 2½ parts butanol, 7½ parts vinyl chloride-vinyl acetate polymer, 22½ parts acetone, 5 parts tricresyl phosphate, and 3 parts zinc carbonate.

9. A composition of matter as described, comprising polymeric material from the group consisting of n-butyl methacrylate polymers and the ethyl, methyl, and propyl ester polymers of acrylic and methacrylic acids; plasticizing material from the group consisting of tricresyl phosphate, triphenyl phosphate, dibutyl phthalate and chlorinated diphenyls; polymeric material from the group consisting of polyvinyl chloride polymer and vinyl chloride-vinyl acetate copolymer the quantity of material from this group being at least equal to that of the first mentioned group; at least one solvent from the group consisting of acetone, mineral spirits, xylol, butanol, ethanol, isobutanol, toluol, naphtha, and Stoddard solvent; zinc carbonate in proportion roughly equal to about 40% by weight of the vinyl polymeric material; inert pigment; and a small quantity of fungicidal material, said plasticizing and solvent materials being in quantity to produce the desired consistency.

10. A composition of matter as described, comprising polymeric material from the group consisting of n-butyl methacrylate polymer and the ethyl, methyl, and propyl ester polymers of arcylic and methacrylic acids; plasticizing material from the group consisting of tricresyl phosphate, triphenyl phosphate, dibutyl phthalate and chlorinated diphenyls; polymeric material from the group consisting of polyvinyl chloride polymer and vinyl chloride-vinyl acetate copolymer the quantity of material from this group being at least equal to that of the first mentioned group; at least one solvent from the group consisting of acetone, mineral spirits, xylol, butanol, ethanol, isobutanol, toluol, naphtha, and Stoddard solvent; and zinc carbonate in proportion roughly equal to about 40% by weight of the vinyl polymeric material; said plasticizing and solvent materials being in quantity to produce the desired consistency.

MARTIN LEATHERMAN.